(12) United States Patent
Lytel et al.

(10) Patent No.: US 6,619,858 B1
(45) Date of Patent: Sep. 16, 2003

(54) OPTICAL INTERCONNECT

(75) Inventors: Rick Lytel, Mountain View, CA (US);
Howard Davidson, San Carlos, CA (US); Theresa Sze, Menlo Park, CA (US); Nyles Nettleton, Campbell, CA (US); Dawei Huang, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/575,418

(22) Filed: May 20, 2000

(51) Int. Cl.[7] .................................................. G02B 6/36
(52) U.S. Cl. ...................................................... 385/89
(58) Field of Search .......................... 385/89, 134, 135, 385/136

(56) References Cited

U.S. PATENT DOCUMENTS

| | | | |
|---|---|---|---|
| 4,863,232 A | * 9/1989 | Kwa | 385/89 |
| 5,245,680 A | 9/1993 | Sauter | 385/24 |
| 5,371,820 A | 12/1994 | Welbourn et al. | 385/76 |
| 5,375,184 A | 12/1994 | Sullivan | 385/129 |
| 5,416,872 A | 5/1995 | Sizer et al. | 385/92 |
| 5,420,954 A | 5/1995 | Swirhun et al. | 385/92 |
| 5,502,817 A | 3/1996 | Krone et al. | 395/200.16 |
| 5,841,974 A | 11/1998 | Krone et al. | 395/200.31 |
| 5,857,042 A | 1/1999 | Robertson et al. | 385/33 |
| 6,243,180 B1 | 6/2001 | Kanterakis et al. | 359/133 |
| 6,328,479 B1 | 12/2001 | Schofield et al. | 385/65 |

FOREIGN PATENT DOCUMENTS

| | | |
|---|---|---|
| EP | 0511779 | 4/1992 |
| JP | 09217122 | 7/1997 |
| JP | 11044820 | 2/1999 |

OTHER PUBLICATIONS

International Search Report application No. PCT/US01/17032 mailed May 7, 2002.

* cited by examiner

*Primary Examiner*—Mark A. Robinson
*Assistant Examiner*—Alessandro Amari
(74) *Attorney, Agent, or Firm*—Meyertons, Hood, Kivlin, Kowert, & Goetzel. P.C.; B. Noël Kivlin (57) ABSTRACT

An optical interconnect is provided that optically connects two adjacent printed circuit boards, or electrical component. The optical interconnect includes a floating frame which is flexibly connected to one electrical component. The floating frame includes a plurality of optical guides. The optical guides are connected to the electrical component either electronically or optically. A second frame, coupled to a second electrical component also contains a plurality of optical guides. A mechanical guide assembly positions the first frame and the second frame are optically coupled. The optical guide in the second frame connects to the second electrical component providing a path for a signal from the first electrical component to the second electrical component.

63 Claims, 8 Drawing Sheets

OPTICAL INTERCONNECT

FIELD OF THE INVENTION

This inventions ling adjacent printed circuit boards, more particularly, this invention relates to using optical signals to connect adjacent circuit boards.

BACKGROUND OF THE INVENTION

In a typical computer cabinet there are multiple printed circuit boards (PCBs), each attached to a back plane. In the context described herein, PCB is used as a generic term to describe any board or module which may require one or more signals be connected to another board or module. The back plane provides not only power for the PCB, but also may provide buses or pathways for signal connection between and among PCBs as well as provide physical support.

The use of back planes may suffer as a technique for moving fast signals from one PCB to another because of inherent inadequacies. Signals generated from any location on the PCB must be routed to the back plane connector, the signals must be transmitted through the back plane connector to the back plane and then through a similar reverse path to the ultimate location on the receiving PCB. This signal path is subject to parasitic capacitance, noise, transmission line effects and other such effects which degrade the signal, and significantly slow it down. Current electrical techniques for compensating for these inadequacies are predicted to become inadequate within a decade.

One way to alleviate this problem is to augment PCB to PCB connections using a flex ribbon which allows a connection from one PCB to another and by-passes the back plane. One end of the flex ribbon is attached to one PCB and then the other end of the ribbon is attached to the other PCB.

In computer systems today, minimizing space is important for many reasons. In such systems, PCBs are located as close together as possible. In some instances the spacing between PCBs is around three or so inches. Additionally, these PCBs are designed to be inserted and removed without affecting system performance.

Using a flex ribbon in such a computer configuration is problematic for at least two reasons. First, the space between PCBs is too small for a technicians to attach a flex ribbon, insert the PCB and than attach the flex ribbon to the second PCB. One solution to this problem is to place the flex ribbon connector on the edge of the PCB. Second, a flex ribbon typically uses wires to transmit signals. In computer systems where speed is important, the inherent slowness of current wiring schemes may not meet system speed performance criteria. Also, when placing a flex ribbon connector on the edge of the PCB, additional time is added to the signal path because the designer must move the signals to the end of the PCB and signal speed is slower on a flex ribbon compared to a PCB.

What is needed is a way to connect adjacent PCBs together that is faster than current techniques and works in the tight confines of rack mounted computer systems.

SUMMARY OF THE INVENTION

In accordance with the invention there is provided an optical interconnect to connect at least one signal on one electrical component to a second electrical component using optical guides. In one aspect, the optical interconnect optically connects two electrical components by having a first frame which is flexibly connected to one electrical component. The frame includes a plurality of optical guides which are connected to the electrical component either electronically or optically. A second frame, coupled to the second electrical component also contains a plurality of optical guides. A mechanical guide assembly positions the first frame and the second frame so that at least one optical guide in the first frame is optically coupled to a respective optical guide in the second frame. The optical guide in the second frame connects to the second electrical component providing a path for a signal from the first electrical component to the second electrical component.

The optical guides could be tubes and the tubes could be adapted to hold receive lenses to focus the light. Furthermore, the lens could be a GRIN (graded index) lens. The lens is approximately 1.0 mm, but could also be in the range from about 0.25 mm to about 1.2 mm. If a lens is in the first frame, it could have a length less than the length of the tube and preferably positioned in the portion of the tube further from the other frame.

In one aspect of the invention, an optical fiber connects a vertical cavity surface emitting laser (VCSEL) on the first electrical component to the GRIN lens. A lens could be disposed on the VCSEL. In another aspect of the invention, a wire connects a signal from the first electrical component to a VCSEL disposed at the first frame. A lens could be disposed on the VCSEL between the VCSEL and the second frame.

In yet another aspect of the invention, the second frame contains GRIN lenses that focus the light to a photodetector coupled to the second electrical component. A lens could be disposed on the photodetector between the photodetector and the GRIN lens.

In still another aspect of the invention, an optical fiber connects a photodetector on the first electrical component to the GRIN lens. A lens could be disposed on the photodetector. In another aspect of the invention, a wire connects a signal from the first electrical component to a photodetector at the first frame. A lens could be disposed on the photodetector between the photodetector and the second frame.

In yet another aspect of the invention, the second frame contains GRIN lenses that focus the light from a VCSEL coupled to the second electrical component. A lens could be disposed on the VCSEL between the VCSEL and the GRIN lens.

BRIEF DESCRIPTION OF THE DRAWING

The accompanying drawings, which are incorporated in and constitute a part of this specification, illustrate at least one embodiment of the invention and, together with the description, serve to explain the advantages and principles of the invention. In the drawings.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments illustrated, but is to be accorded the widest possible scope consistent with the principles.

Reference will now be made in detail to an implementation consistent with the principles of the present invention as illustrated in the accompanying drawings. Wherever possible, the same reference numbers will be used throughout the drawings and the following description to refer to the same or like parts.

Figure 1:
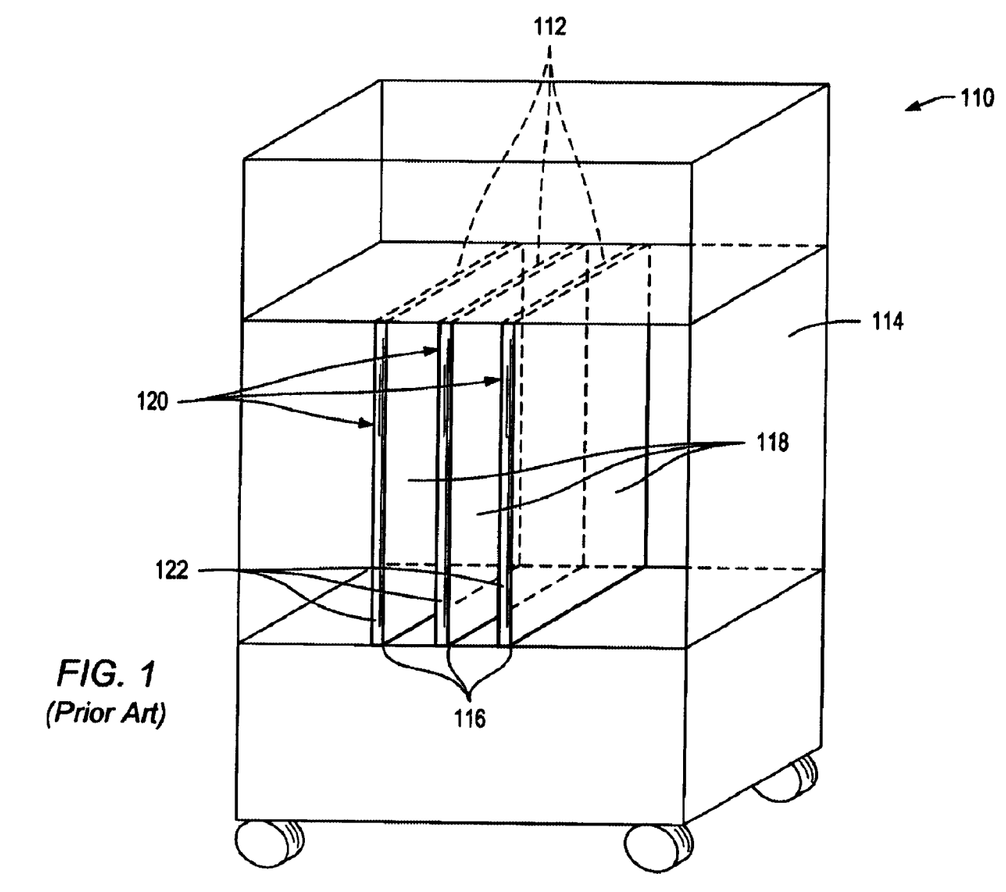
FIG. 1 is an illustration of a electrical component rack.

FIG. 1 illustrates a typical cabinet 110 for housing the components of a computer system. Cabinet 110 houses various components which are not shown for the sake of simplicity including power supplies, disk drives, input/output units, and various cables and wires. Cabinet 110 includes electrical modules 112 which may be printed circuits boards or any other type of module that could be contained in cabinet 110. Although FIG. 1 illustrates three electrical modules 112, any number is contemplated Cabinet 110 also includes back plane 114 which provides power to electrical modules 112 and also connects selected signals from electrical modules 112 to other places in cabinet 110. Back plane 114 typically includes one or more buses (not shown) to which each electrical module 112 connects.

Electrical modules 112 can typically be inserted and removed without adversely affecting the performance of the computer system. Guides 116 are provided to seat electrical modules 112 along a predefined path and to ensure connection to the back plane 114. Space is an issue in housings such as cabinet 110. Accordingly, designers attempt to position electrical modules 112 close together. For example, a 3 inch spacing between boards is not uncommon among some manufacturers.

This limited space between electrical modules 112 does not readily allow a technician to connect one electrical module 112 to another by attaching connectors to internal surfaces 118 and 120 of electrical modules 112 respectively.

Technicians and designers are typically limited to the connections provided by back plane 114 and any connectors placed on edges 122 of electrical modules 112. Connectors placed on edges 122 suffer the same issues as back plane 114 in that signals must be routed from the various locations on the surfaces 118 and 120 the edge 122 and edge connector and then to the final destination.

Figure 2:
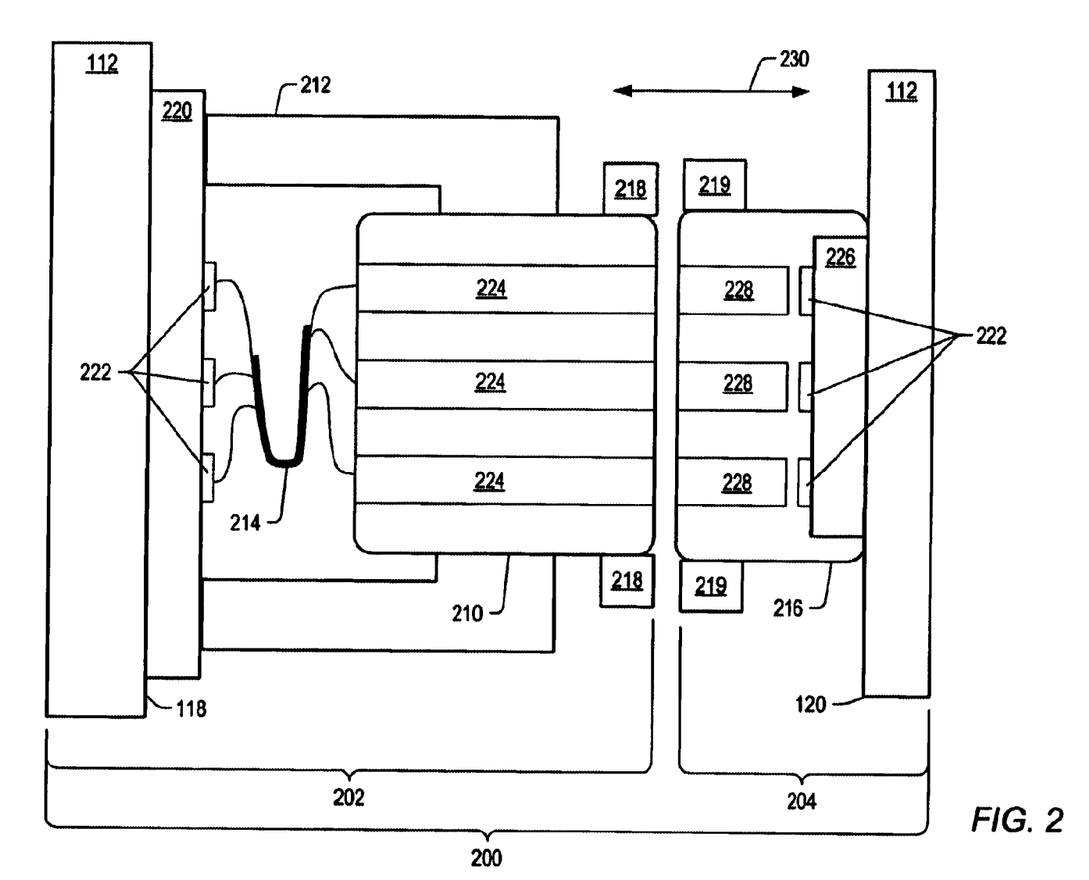
FIG. 2 is an illustration of the optical interconnect.

An optical interconnect according to the invention includes one frame flexibly mounted to one surface of an electrical module, a second frame coupled to a second electrical module, and a guide mechanism for aligning optical paths in the two frames creating an optical path for transmitting signals to and from one electrical module to the other. FIG. 2. illustrates an optical interconnect 200 consistent with the principles of the invention that connects, in one embodiment, signals from one surface of an electrical module 112 to the nearest surface of another electrical module 112. Optical interconnect 200 includes an assembly 202, having a frame 210, a flexible mounting assembly 212, a flexible connector 214, and alignment guide members 218, and an assembly 204 having a frame 216 and alignment guide members 219.

Frame 210 connects to a base 220 via flexible mounting assembly 212. The base 220 is attached to electrical module 112 and to flexible mounting assembly 212. A flexible connector 214 provides a path for signals between the base 220 and the frame 210. More specifically, the flexible connector 214 provides a path between the frame 210 and signal interfaces 222. Signal interfaces 222 loosely define the transition between electrical and optical signals and are connected to various points within electrical module 112 via connections between base 220 and electrical module 112. For the sake of simplicity, these later connections are not described but would be well within the knowledge of one skilled in the art. Frame 210 also includes a plurality of optical guides 224 aligned along an axis of transmission 230.

Frame 216 is coupled to a base 226. Similar to base 220, base 226 couples signal interfaces 222 to locations within electrical module 112 to which base 226 is connected. Frame 216 also includes a plurality of optical guides 228 aligned along the axis of transmission 230.

Together, guide members 218 and 219 provide a mechanism to ensure optical alignment between an optical guide 224 and its counterpart optical guide 228 in the axis of transmission 230. While FIG. 3 only illustrates three optical guide pairs, any number could be implemented.

Preferably, assemblies 202 and 204 are mounted on the surfaces 118 and 120, respectively, prior to electrical module 112 being inserted in a cabinet 110. System designers of electrical modules 112 attempt to ensure that the assemblies are relatively positioned opposite each other when the electrical modules 112 are inserted in the cabinet 110. Once a technician has inserted an electrical module 112 in to cabinet 110, the flexible mounting assembly 212 positions frame 210 in optical alignment with frame 216. Flexible mounting assembly 212 is pliant enough to provide sufficient optical alignment even in the presence of manufacturing errors.

Once frames 210 and 216 are in optical alignment, optical interconnect 200 provides a signal transmission path between surfaces 118 and 120. While FIG. 2 illustrates base 220 connected to surface 118 and base 226 connected to surface 120, it is contemplated that the either base could be attached to either surface. Preferably, most electrical modules 112 would have on one surface bases of the same type and on the other surface, bases of the other type for symmetry.

Figure 3:
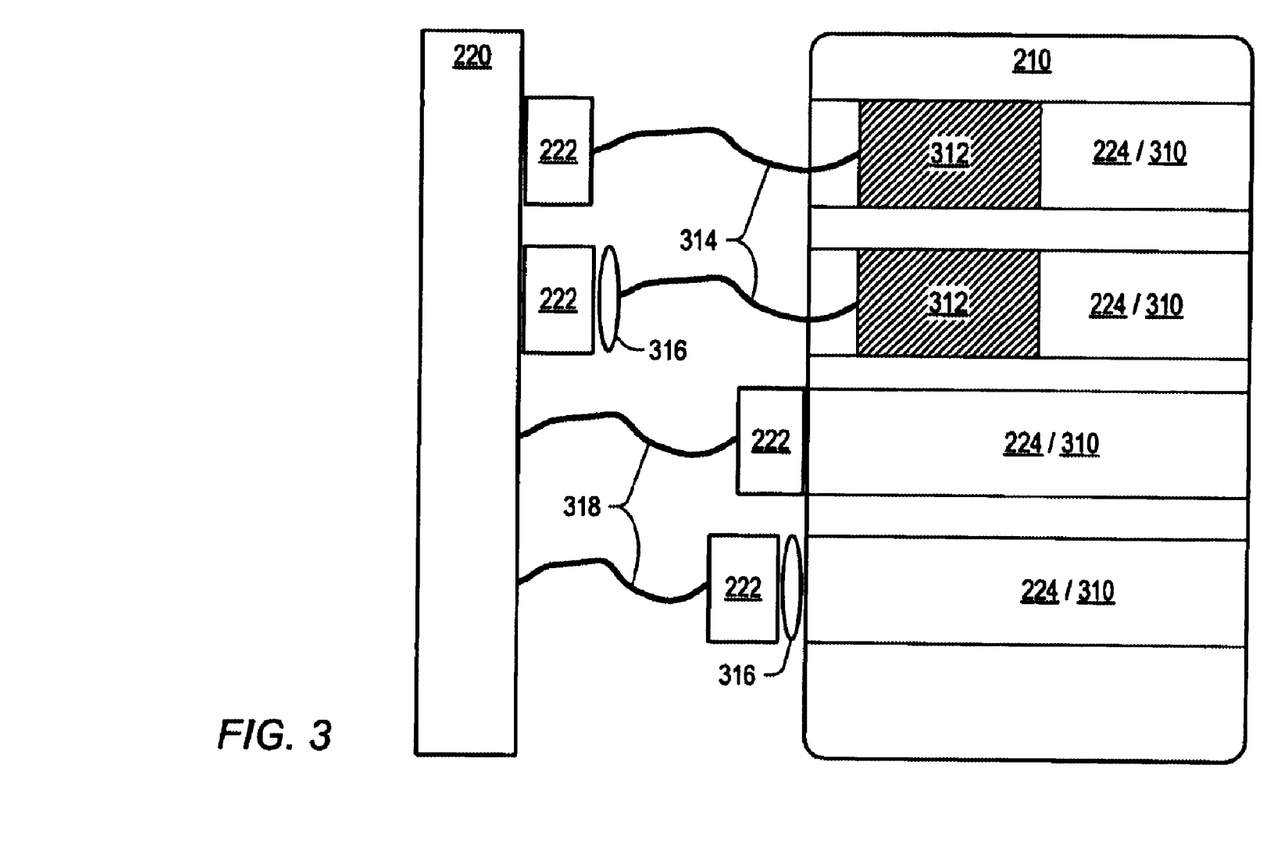
FIG. 3 is an illustration of alternate embodiments to connect the first frame to signals on the first electrical component.

Frame 210 provides optical transmission paths for signals originating from either direction via the optical guides 224 and 228. FIG. 3 illustrates embodiments for creating an optical transmission path. Frame 210 is preferably made from plastic via injection molding, but any material would suffice provided it can serve to optically isolate neighboring optical guides 224. Optical guides 224 may include tubes 310 formed during the injection molding or by drilling out material from frame 210. Preferably, the tubes 310 are formed during the injection molding. The injection molding process creates smoother walls which help to better optically isolate optical guides 224 as compared to drilling. Alternately, tubes 310 may be formed by any method such that an optical path is created that assists in isolating the optical signal from its neighbors. Additionally, tubes 310 could simply be represented by boundary between two materials have a difference in refractive index. Preferably, tubes 310 have a diameter transverse to the axis of transmission 230 from about 0.8 mm to about 1.0 mm. More preferably, the diameter is about 0.9 mm. Tubes 310 are preferably spaced such that no two tubes 310 are closer than about 0.5 mm.

In one embodiment, optical guide 224 includes a lens 312. An optical fiber 314 connects lens 312 to signal interface 222. Optical fiber 314 is optically coupled to both lens 312 and signal interface 222 by well known means. If lens 312 is receiving light from frame 216, then signal interface 222 is a photodetector. On the other hand, if lens 312 is to transmit a signal from base 220, then signal interface 222 is a vertical cavity emitting laser (VCSEL) or any other device able to transmit light. In another embodiment, a lens 316 is disposed between signal interface 222 and the optical fiber 314. Lens 316 could be a microlens made of glass or another material such that it can serves to focus incoming light to an adjacent signal interface 222 or focus light coming from signal interface 222 toward the optical path defined by optical guides 224 or 228.

In another embodiment, the tube 310 does not contain a lens 312 and the signal interface 222 is adjacent to frame 210 instead of base 220. In this instance, a wire 318 transmits the signal between the base 220 and signal interface 222. As before, signal interface 222 may be either a light emitting source, such as a VCSEL, or a photodetector depending on the desired direction of the signal. In another embodiment, a lens 316 is disposed between the signal interface 222 and optical guide 224. The light emitting source and photodetector may be coupled to the frame 210 by any well known means.

Preferably, lens 312 is a graded index (GRIN) lens that focuses the light from optical fiber 314 along optical guide 224 in the case of transmission and focuses the light received along optical guide 224 toward optical fiber 314 in the case of signal reception. Preferably, the length of the GRIN is less than the length of frame 210 in the direction axis of transmission 230 to aid in manufacturing, but the length could be equal to or greater than frame 210. Preferably, lens 312 is positioned in the portion of the tube 310 closer to base 220. Appropriate mechanisms from the art may be applied to correctly position and secure the lens 312 in the tube 310.

Figure 4:
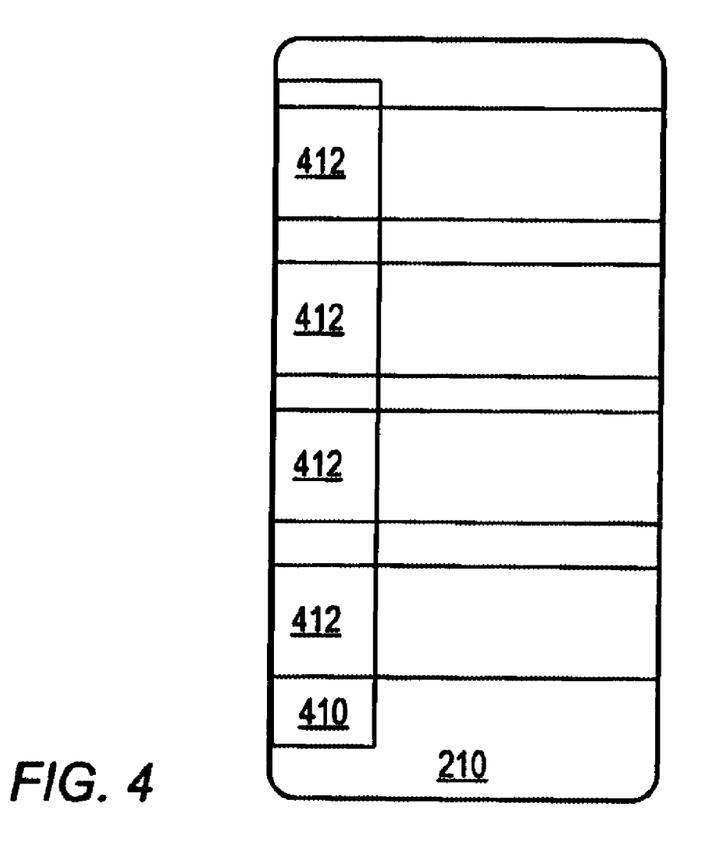
FIG. 4 is an illustration of alternate embodiment to provide lenses.

In one embodiment, illustrated in FIG. 4, an array 410 of lenses 412 is contemplated instead of a physically separate lens 312 in each tube 310. The array of lenses 410 could be made with the use of planar microlenses.

In the case of transmission of an optical signal from base 220, signal interface 222 emits an optical signal which is relayed via optical fiber 314 to lens 312 according to one embodiment. In this instance, lens 312 focuses the optical signal in the direction of the optical guide 224 which is received by a respective optical guide 228 in frame 216.

Figure 5:
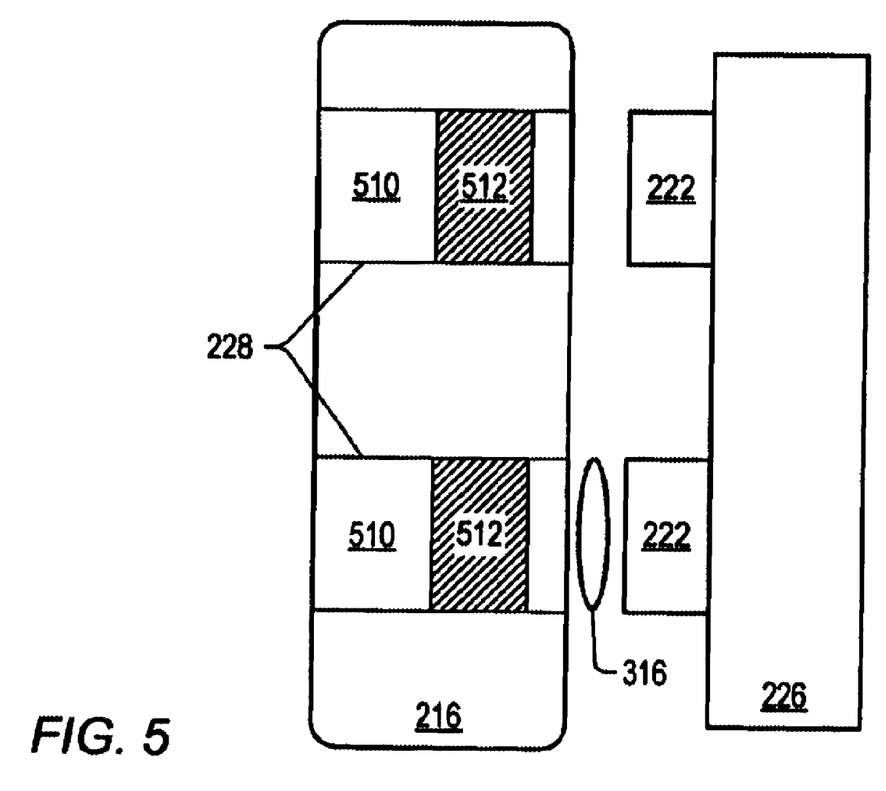
FIG. 5 is an illustration of alternate embodiments of the second frame and associated optical devices.

Referring to FIG. 5, optical guides 228, may contain tubes 510 similar to tubes 310. In one embodiment, optical guide 228 includes a lens 512 to assist in focusing light to/from signal interface 222. If lens 512 is receiving light from frame 210, then the signal interface 222 is a photodetector. On the other hand, if lens 512 is to transmit a signal from base 226, then signal interface 222 is a vertical cavity emitting laser (VCSEL) or any other device able to transmit light. In another embodiment, a lens 316 is disposed between signal interface 222 and lens 512.

One embodiment of assembly 204 may be explained with reference to FIG. 6 which illustrates an assembly 204 mounted on electrical module 112. In this embodiment, frame 216 includes side portions 610 which connect to base 226. Side portions 610 include tabs 612. Base 226 includes cavities 614 adapted to receive tabs 612 such that the combination of tabs 612 and cavities 614 serve to align optical guides 228 along the optical transmission or reception path of an associated signal interface 222.

Figure 6:
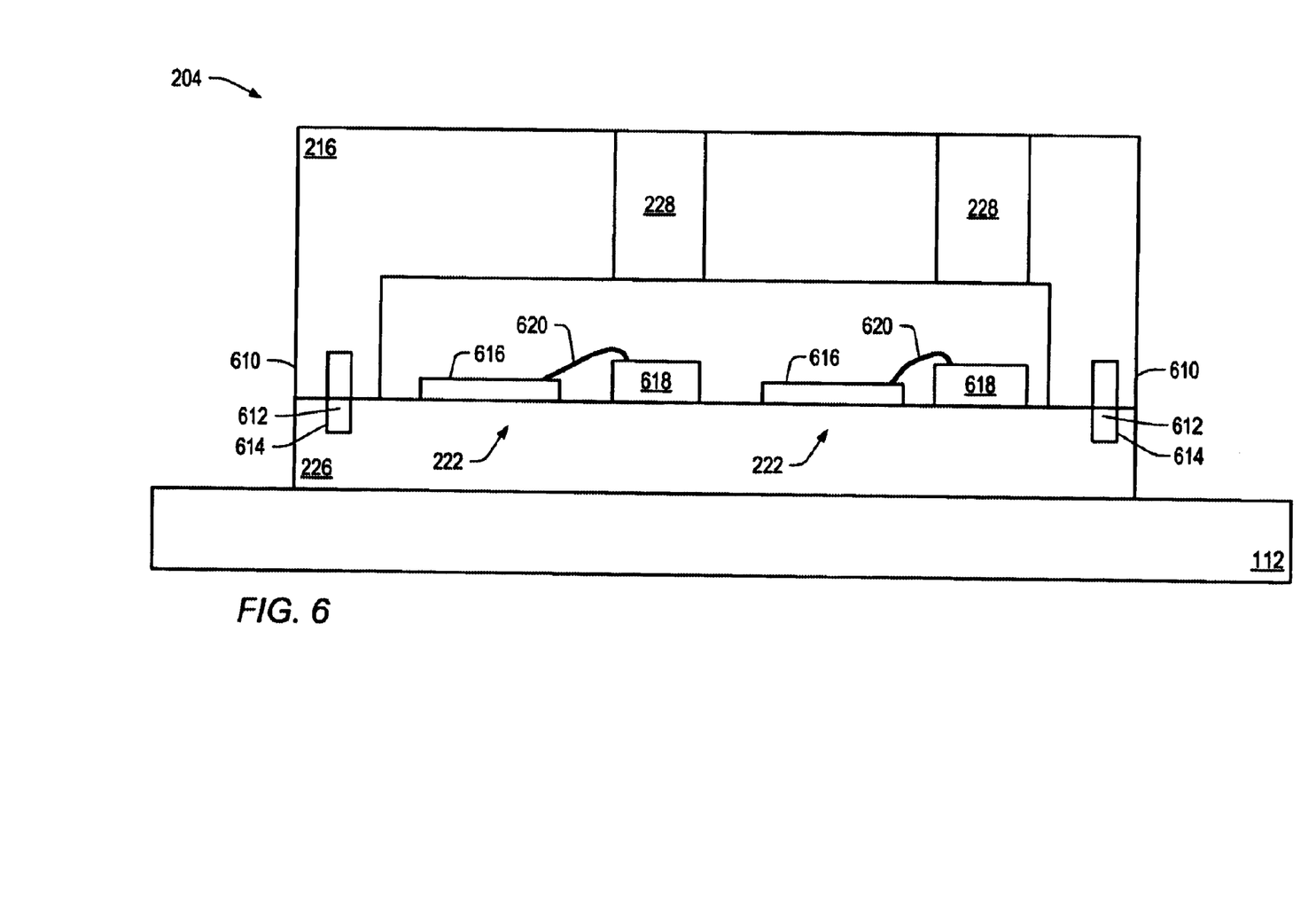
FIG. 6 is a more detailed illustration of one embodiment of the second frame coupled to the second electrical component.

FIG. 6 illustrates two signal interfaces 222 optically aligned with an associated optical guide 228. The two signal interfaces 222 illustrated in FIG. 6 are VCSELs and include driver chips 616, VCSEL cells 618, and wires 620 which connect driver chips 616 and VCSEL cells 618.

One skilled in the art would recognize many different ways to connect frame 216 to base 226. For example, instead of a tab 612, the positioning mechanism could be accomplished by providing a pin which fits partially in base 226 and partially in frame 216. in another example, tab 610 could be on base 226 and the cavity 614 could be on frame 216.

Figure 7:
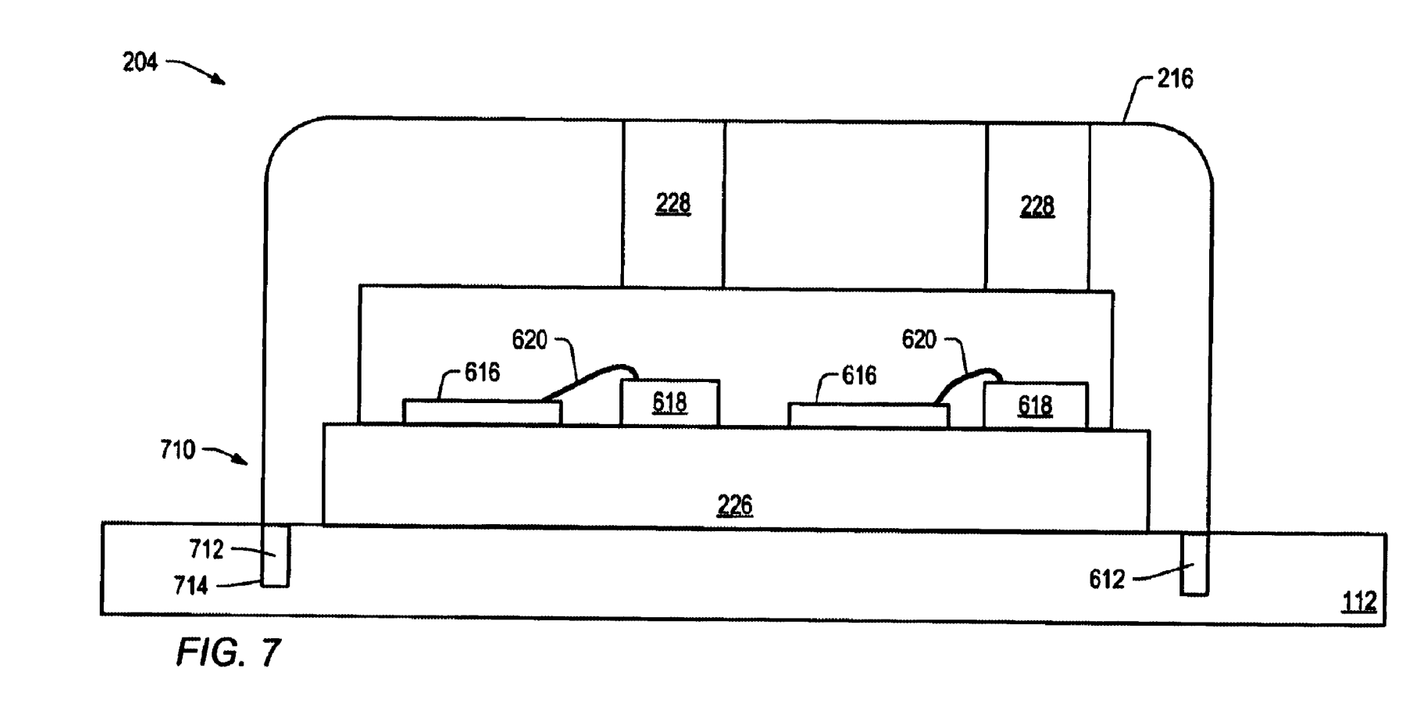
FIG. 7 is a more detailed illustration of one another embodiment of the second frame coupled to the second electrical component.

FIG. 7 illustrates another embodiment of assembly 204 wherein frame 216 further includes side portions 710 and tab 712. As illustrated in FIG. 7, side portions 710 extend down around the circumference of base 226. Tabs 712 are adapted to be inserted in cavities 714 in electrical module 112.

One advantage found is that self aligning mechanisms increase reliability and functionality by reducing positioning errors. For example, tabs 612 and 712 serve to reduce one source of error by defining the location a removable component may be placed.

Figure 8:
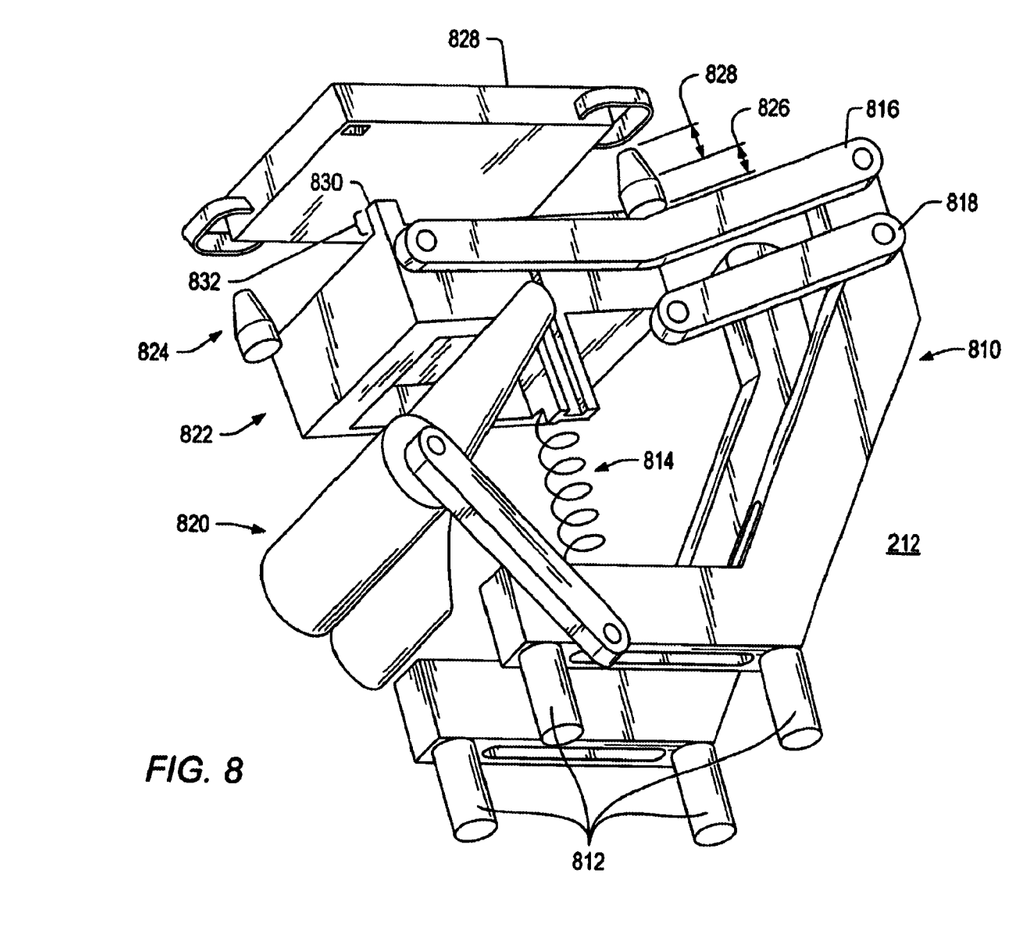
FIG. 8 is a detailed view of one embodiment of the guide assembly.

Flexible mounting assembly 212 provides a mechanism whereby frames 210 and 216 may be placed in optical alignment after electrical modules 112 have been inserted in cabinet 110. One embodiment of flexible mounting assembly 212 is illustrated in FIG. 8. Flexible mounting assembly 212 includes semi-rigid support members 810 including pins 812, a spring 814, positioning members 816 and 818, a scissor link 820, and frame support 822.

Pins 812 are adapted to insert in appropriate cavities in base 220. Positioning members 816 and 818 are of unequal lengths and connect frame support 822 to semi-rigid support members 810. Spring 814 biases frame support 822 in a direction away from pins 812. Although illustrated as a spring, any device which biases frame support 822 in a direction away from pins 812 would suffice. Positioning members 816 and 818 work in combination with spring 814 to move frame support 822 in the bias direction relatively parallel to base 220.

Frame support 822 includes coarse alignment guides 824 and fine alignment guides 826. Frame support 822 includes two course alignment guides 824 disposed on opposite corners of frame support 822. Each coarse alignment guide 824 extends upward from frame support 822 and is generally cylindrical in shape for a distance 826 then changes in shape to become conical and having a cross section tapering as the coarse alignment guide 822 extends away from frame support 822 for a distance 828.

Frame support 822 also include fine alignment guides 830 disposed on opposite, corners of frame support 822 and which are on adjacent corners to coarse alignment guides 824. Fine alignment guides 830 extend upward from frame support 822 for a distance 832. Preferably, distance 832 is less than distance 826.

While the preferred embodiments of the present invention have been illustrated herein in detail, it should be apparent that modifications and adaptations to those embodiments may occur to those skilled in the art without departing from the scope of the present invention as set forth in the following claims.

What is claimed is:

1. An optical interconnect for optically connecting electrical components comprising:
 a first frame having an axis of transmission and a plurality of first optical guides configured to facilitate optical transmission along the axis of transmission;
 a flexible mounting assembly connected to the first frame and configured to couple to a first electrical component at a first internal surface, of said first electrical component;
 a second frame having a plurality of second optical guides and coupled to a second electrical component, at a second internal surface, of said second electrical component, wherein said second internal surface faces said first internal surface; and
 a guide assembly configured to align the plurality of first optical guides with the plurality of second optical guides along the axis of transmission, wherein the axis of transmission is substantially straight and runs substantially perpendicular to a plane of said first internal surface and a plane of said second internal surface.

2. The optical interconnect of claim 1,
 wherein at least one of the first optical guides comprises:
 a tube aligned parallel to the axis of transmission and configured to receive a lens.

3. The optical interconnect of claim 2,
 wherein the lens is a GRIN lens.

4. The optical interconnect of claim 3,
 wherein the GRIN lens has a diameter, traverse to the transmitting direction, from about 0.25 mm to about 2.0 mm.

5. The optical interconnect of claim 3,
 wherein, along the axis of transmission, the GRIN lens has a lens length less than a length of the first frame.

6. The optical interconnect of claim 3,
 wherein the first frame includes a first surface and a second surface relatively perpendicular to the axis of transmission and the first surface is closer to the first electrical component than the second surface, and the GRIN lens is closer to the first surface than to the second surface.

7. The optical interconnect of claim 3, further comprising an optical element connected to the first electrical component and optically coupled to the GRIN lens.

8. The optical interconnect of claim 7, wherein an optical fiber connects the optical element and the GRIN lens.

9. The optical interconnect of claim 7, further comprising:
 a flexible connector coupled to the first frame and configured adapted to connect to the first electrical component that connects signals between the first electrical component and respective optical guides and includes at least one optical fiber that connects the optical element and the GRIN lens.

10. The optical interconnect of claim 7, wherein the optical element is a vertical cavity surface emitting laser (VCSEL).

11. The optical interconnect of claim 7, wherein the optical element is a photo detector.

12. The optical interconnect of claim 7, wherein the optical element comprises an active optical element and a surface lens.

13. The optical interconnect of claim 1, wherein the first frame comprises:
 a plurality of tubes aligned parallel to the axis of transmission each having a first portion and a second portion, the first portion closer to the first electrical component than the second portion.

14. The optical interconnect of claim 13, further comprising an optical element disposed between the electrical component and the first portion and electrically connected to the electrical component.

15. The optical interconnect of claim 13, wherein the optical element is a VCSEL.

16. The optical interconnect of claim 13, wherein the optical element is a photo detector.

17. The optical interconnect of claim 13, further comprising a surface lens disposed between the optical element and the second portion.

18. The optical interconnect of claim 1, wherein at least one of the plurality of second optical guides comprises:
 a tube aligned parallel to the axis of transmission and configured to receive a lens.

19. The optical interconnect of claim 18, wherein the lens is a GRIN lens.

20. The optical interconnect of claim 19, wherein the GRIN lens has a diameter, transverse to the transmitting direction, from about 0.8 mm to about 2.0 mm.

21. The optical interconnect of claim 19, wherein the second frame includes a first surface and a second surface relatively perpendicular to the axis of transmission and the first surface is closer to the second electrical component than the second surface, and the GRIN lens is closer to the first surface than to the second surface.

22. The optical interconnect of claim 18, wherein, along the axis of transmission, the GRIN lens has a lens length less than a length of the second frame.

23. The optical interconnect of claim 18, further comprising an optical element coupled to the second electrical component and in optical alignment with the tube.

24. The optical interconnect of claim 23, wherein the optical element is a VCSEL.

25. The optical interconnect of claim 23, wherein the optical element is a photo detector.

26. The optical interconnect of claim 23, further comprising a surface lens disposed between the lens and the optical element.

27. The optical interconnect of claim 1, wherein the axis of transmission is relatively perpendicular to the first electrical component.

28. The optical interconnect of claim 1, further comprising a flexible connector coupled to the first frame and configured to connect to the first electrical component, connecting signals between the first electrical component and respective optical guides.

29. The optical interconnect of claim 1, wherein the first electrical component and the second electrical component are circuit boards mounted in a cabinet.

30. The optical interconnect element of claim 1, wherein the flexible mounting assembly includes at least one positioning member and at least one spring, wherein the positioning member and the spring move the first frame in a bias direction substantially parallel to the axis of transmission.

31. The optical interconnect element of claim 30, further comprising:
 a base connected to the first electrical component, wherein the base has at least one cavity;
 wherein the at least one alignment guide has at least one pin, wherein the at least one pin inserts into the at least one cavity of the base when the at least one positioning member and the at least one spring move the first frame in the bias direction substantially parallel to the axis of transmission.

32. The optical interconnect element of claim 1, wherein the axis of transmission intersects the first internal surface and the second internal surface.

33. An optical interconnect element comprising:
   a frame having an axis of transmission and a plurality of optical guides, wherein the frame is connected to a flexible mounting assembly that is coupled to a first internal surface, of a first electrical component, wherein said plurality of optical guides are configured to facilitate optical transmission along the axis of transmission;
   at least one alignment guide coupled to the frame, wherein the alignment guide is configured to align the plurality of optical guides on the frame along the axis of transmission with a plurality of second optical guides coupled to a second electrical component, wherein said axis of transmission is substantially straight and runs substantially perpendicular to a plane of said first internal surface and a plane of a second internal surface, of a the second electrical component, wherein said second internal surface faces said first internal surface.

34. The optical interconnect of claim 33, wherein at least one of the optical guides comprises:
   a tube aligned parallel to the axis of transmission and configured to receive a lens.

35. The optical interconnect of claim 34, wherein the lens is a GRIN lens.

36. The optical interconnect of claim 35, wherein the GRIN lens has a diameter, transverse to the transmitting direction, from about 0.25 mm to about 2.0 mm.

37. The optical interconnect of claim 35,
   wherein, along the axis of transmission, the GRIN lens has a lens length less than a length of the frame.

38. The optical interconnect of claim 35,
   wherein the frame includes a first surface and a second surface relatively perpendicular to the axis of transmission and the first surface is closer to the first electrical component than the second surface, and the GRIN lens is closer to the first surface than to the second surface.

39. The optical interconnect of claim 35, further comprising an optical element connected to the electrical component and optically coupled to the GRIN lens.

40. The optical interconnect of claim 39, wherein an optical fiber connects the optical element and the GRIN lens.

41. The optical interconnect of claim 39, further comprising a flexible connector coupled to the frame and configured to connect to the electrical component that connecting signals between the electrical component and respective optical guides and includes at least one optical fiber that connects the optical element and the GRIN lens.

42. The optical interconnect of claim 39, wherein the optical element is a vertical cavity surface emitting laser (VCSEL).

43. The optical interconnect of claim 39, wherein the optical element is a photo detector.

44. The optical interconnect of claim 39, wherein the optical element comprises an active optical element and a surface lens.

45. The optical interconnect of claim 39, wherein the frame further comprises:
   a plurality of tubes aligned parallel to the axis of transmission each having a first portion and a second portion, the first portion closer to the electrical component than the second portion.

46. The optical interconnect of claim 45, further comprising an optical element disposed between the electrical component and the first portion and electrically connected to the electrical component.

47. The optical interconnect of claim 45, wherein the optical element is a VCSEL.

48. The optical interconnect of claim 45, the optical element is a photodetector.

49. The optical interconnect of claim 45, further comprising a surface lens disposed between the optical element and the second portion.

50. The optical interconnect element of claim 33, wherein the first electrical component and the second electrical component are circuit boards mounted in a cabinet.

51. An optical interconnect element comprising:
   a first frame having a first plurality of optical guides and coupled to an electrical component; and
   at least one alignment guide coupled to the first frame, wherein the alignment guide is configured to align an axis of transmission of each of the first plurality of optical guides to an axis of transmission of each of a plurality of second optical guides of a second frame, said axis of transmission of each of the first plurality of optical guides and the axis of transmission of each of the second plurality of optical guides are substantially straight and run substantially perpendicular to a plane of a first internal surface, of a first electrical component, and a plane of a second internal surface, of a second electrical component, wherein said second internal surface faces said first internal surface.

52. The optical interconnect of claim 51, wherein at least one of the first plurality of optical guides comprises:
   a tube aligned parallel to the axis of transmission and configured to receive a lens.

53. The optical interconnect of claim 52, wherein the lens is a GRIN lens.

54. The optical interconnect of claim 53, wherein the GRIN lens has a diameter, transverse to the transmitting direction, from about 0.825 mm to about 2.0 mm.

55. The optical interconnect of claim 53, wherein, along the axis of transmission, the GRIN lens has a lens length less than a length of the second frame.

56. The optical interconnect of claim 53, wherein the first frame includes a first surface and a second surface relatively perpendicular to the axis of transmission and the first surface is closer to the electrical component than the second surface, and the GRIN lens is closer to the first surface than to the second surface.

57. The optical interconnect of claim 52, further comprising an optical element coupled to the electrical component and in optical alignment with the tube.

58. The optical interconnect of claim 57, wherein the optical element is a VCSEL.

59. The optical interconnect of claim 57, wherein the optical element is a photo detector.

60. The optical interconnect of claim 57, further comprising a surface lens disposed between the lens and the optical element.

61. The optical interconnect of claim 51, wherein the first frame is connected to the first internal surface and the second frame is connected to the second internal surface.

62. The optical interconnect of claim 61, wherein a path for an optical signal between the first frame and the second internal surface is substantially straight.

63. The optical interconnect of claim 51, wherein the first electrical component and the second electrical component are circuit boards mounted in a cabinet.

* * * * *

UNITED STATES PATENT AND TRADEMARK OFFICE
CERTIFICATE OF CORRECTION

PATENT NO. : 6,619,858 B1  Page 1 of 1
DATED : September 16, 2003
INVENTOR(S) : Lytel et al.

It is certified that error appears in the above-identified patent and that said Letters Patent is hereby corrected as shown below:

<u>Column 7,</u>
Line 51, please delete "adapted".

<u>Column 9,</u>
Line 19, please change "surface, of a the" to -- surface, of the --.

<u>Column 10,</u>
Line 20, please change "plurality of second optical" to -- second plurality of optical --.

Signed and Sealed this

Twentieth Day of April, 2004

JON W. DUDAS
*Acting Director of the United States Patent and Trademark Office*